Figure 1:
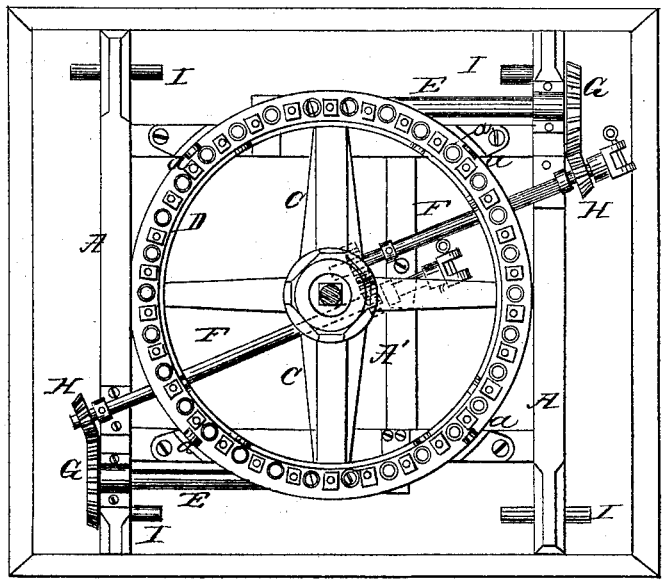
Figure 2:
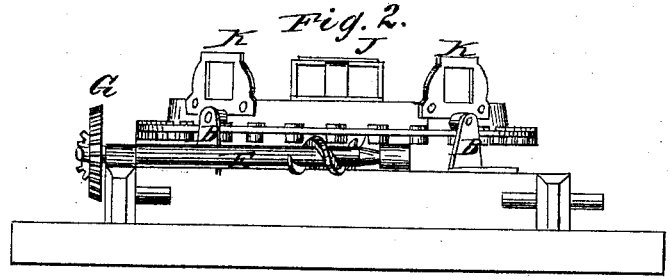

J. B. Sweetland,

Horse Power,

№ 57,995. Patented Sep. 11, 1866.

Witnesses
John P. Jacobs
Charles Alexander

Inventor
J. B. Sweetland
per
Alexander & Mason
Attys.

UNITED STATES PATENT OFFICE.

J. B. SWEETLAND, OF PONTIAC, MICHIGAN.

IMPROVEMENT IN HORSE-POWERS.

Specification forming part of Letters Patent No. 57,995, dated September 11, 1866.

*To all whom it may concern:*

Be it known that I, J. B. SWEETLAND, of Pontiac, in the county of Oakland and State of Michigan, have invented certain new and useful Improvements in Horse-Powers; and I do hereby declare that the following is a full, clear, and exact description of the same, reference being had to the accompanying drawings, and to the letters of reference marked thereon.

In the annexed drawings, A represents the frame of the machine, which is made square, of strong timber, firmly framed together.

A' represents a cross-beam in this frame, the purpose of which will be hereinafter described.

C represents a piece of metal, which lies across the frame, being secured at its ends to the frame by means of bolts. This piece of metal is arched, and is provided near its center with a hole or opening to receive the hub of the driving-wheel.

D represents the driving or master wheel of the machine, which consists of a flanged rim (the flange extending up) made of metal, and provided with arms which extend into a hub which is centrally located within said rim. The hub of this wheel is upon its under side, and extends, as set forth, through the opening or hole in the metallic piece C.

B B represent metallic standards, which are erected upon the frame A, said standards having pins passing through them near their upper ends, upon which pins are friction-rollers *a a*, which run upon top of the outer rim of the wheel D.

There are a series of pins passing up through the rim of wheel D from its under side, said pins being in a vertical position, and upon each of these pins, beneath the wheel, are rollers. Between each pin in the wheel (said pins being equidistant) are holes or openings cut in the wheel, which serve two purposes: they serve to make said wheel lighter, and at the same time they answer to oil the rollers through.

E E represent two shafts, which have their bearings upon the frame A, and which lie parallel to the two opposite sides of said frame. Each of these shafts is provided with a thread made wide enough to receive the rollers upon the pins secured to the wheel D. Said shafts are also provided with bevel-gear wheels G G at their outer ends.

The wheels G G gear into bevel-gear wheels H H, as shown, upon shafts F F. The shafts F F lie under wheel D, and both in the same direction.

The threads upon the shafts E E are either both right or both left hand screws, which being the case, each of the shafts F F have motion in different directions, thus giving either a right or left hand motion without change of direction of the machine.

The cross-beam A' answers as a support for the shafts F F, one of said shafts having the bearing for its rear end, and the other having the bearing for its forward end, upon said beam.

The shafts F are provided with the usual jaws and pins for connecting them to the power to be driven.

I I represent pins, which are driven through holes in the corners of the frame, and answer the purpose of handles for lifting the said frame in moving it about from one place to another.

The holes in the rim of the wheel are made large enough to extend over the peripheries of the rollers under the rim, so that oil may be easily applied to them, (the rollers.)

At the center and over the top of the wheel D is formed a metallic box, in the sides of which openings are cut to receive the ends of the levers for running the machine. These levers also pass through metallic loops K, erected and secured upon the flange of the wheel-rim.

The small rollers under the wheel are intended to be made upon their tops a little sloping from the periphery to the hole that the pin passes through, so that in pouring on oil it will readily run into the bearing of each pin.

Having thus fully described my invention, what I claim as new, and desire to secure by Letters Patent, is—

1. The two shafts E E, situated upon opposite sides of the wheel D, and both provided with right threads or both with left threads, as and for the purpose specified.

2. The shafts F F, lying under the wheel D, both in the same direction, and turning in opposite directions, as and for the purpose set forth.

3. Providing the rim of the wheel D with holes, as shown, as and for the purpose specified.

4. The arrangement of the shafts E E, gear-wheels G H, and shafts F F with the wheel D, as constructed, as and for the purpose set forth.

As evidence that I claim the foregoing I have hereunto set my hand in the presence of two witnesses.

J. B. SWEETLAND.

Witnesses:
E. F. DEWEY,
J. S. DEWEY.